United States Patent [19]
Allen et al.

[11] Patent Number: 5,360,292
[45] Date of Patent: Nov. 1, 1994

[54] METHOD AND APPARATUS FOR REMOVING MUD FROM AROUND AND INSIDE OF CASINGS

[75] Inventors: James R. Allen; Alton J. LaLande, both of Lafayette, La.

[73] Assignee: Flow International Corporation, Kent, Wash.

[21] Appl. No.: 89,258

[22] Filed: Jul. 8, 1993

[51] Int. Cl.⁵ .............................................. E02D 9/00
[52] U.S. Cl. .................................. 405/249; 405/228; 405/232; 37/323; 175/67
[58] Field of Search .......................... 166/67, 68, 312; 175/67; 37/307, 317, 320, 321, 322, 323, 346; 405/195.1, 226, 228, 229, 232, 248, 249

[56] References Cited

U.S. PATENT DOCUMENTS

| | | | |
|---|---|---|---|
| 2,076,823 | 4/1937 | Newell | 37/322 |
| 2,265,082 | 12/1941 | O'Neill | 51/8 |
| 2,315,496 | 4/1943 | Boynton . | |
| 3,066,735 | 12/1962 | Zingg . | |
| 3,081,828 | 3/1963 | Quick | 175/67 |
| 3,145,776 | 8/1964 | Pittman . | |
| 3,153,290 | 10/1964 | Saito | 37/323 X |
| 3,338,305 | 8/1967 | Pittman et al. . | |
| 3,393,736 | 7/1968 | Goodwin . | |
| 3,585,699 | 6/1971 | Shuttle | 29/407 |
| 3,646,598 | 2/1972 | Chelminski | 405/228 |
| 3,673,716 | 7/1972 | Trondle | 37/322 |
| 4,047,569 | 9/1977 | Tagirov et al. | 166/308 |
| 4,223,724 | 9/1980 | Levoni et al. | 166/68 |
| 4,346,761 | 8/1982 | Skinner et al. | 166/206 |
| 4,558,744 | 12/1985 | Gibb | 405/226 X |
| 4,575,282 | 3/1986 | Pardue et al. | 405/228 |
| 4,619,556 | 10/1986 | Parra | 405/195.1 |
| 4,768,899 | 9/1988 | Dysarz | 405/195.1 |
| 4,808,037 | 2/1989 | Wade et al. | 405/226 |
| 5,001,870 | 3/1991 | Yokota et al. | 51/410 |
| 5,002,434 | 3/1991 | Massoudi | 405/226 |
| 5,010,694 | 4/1991 | Agbede | 51/429 |

FOREIGN PATENT DOCUMENTS

| | | | |
|---|---|---|---|
| 165326 | 12/1980 | Japan | 405/228 |
| 2164915 | 6/1990 | Japan | 405/232 |
| 1613616 | 12/1990 | U.S.S.R. | 37/321 |

OTHER PUBLICATIONS

Brochure: "All Pumps Were Not Created Equal", Toyo Pumps, Published: 1987.

*Primary Examiner*—Randolph A. Reese
*Assistant Examiner*—John A. Ricci
*Attorney, Agent, or Firm*—Seed and Berry

[57] ABSTRACT

A method and apparatus for removing mud from around and inside of a casing is shown and described. Examples of such casings include piles of offshore oil production platforms. In accordance with a preferred embodiment of the present invention, a submersible pump having a propeller and coupled to several nozzles is lowered to a position adjacent the mud to be removed. A volume of water is forced through the nozzles against the mud, the action of which, together with the propeller, serves to dilute and break up the mud. The submersible pump then forces the mud and water upward through a flexible tube to be discharged into open water.

6 Claims, 5 Drawing Sheets

METHOD AND APPARATUS FOR REMOVING MUD FROM AROUND AND INSIDE OF CASINGS

TECHNICAL FIELD

This invention relates to submersible pumps, and more particularly, to a method and apparatus for removing obstructing mud from around and inside of casings.

BACKGROUND OF THE INVENTION

Offshore platforms used in the recovery of mineral resources such as oil and gas from below the sea bed must be removed and appropriately disposed of when the wells serviced by the platforms run dry. The platforms are anchored to the ocean floor by piles which are hollow casings or pipes that are contained within the platform legs and driven into the sea bed, to depths up to and beyond 160 feet. Although the piles may vary in size, a common diameter is 42 inches. The platforms draw oil up through conductors which are made of several hollow casings of different diameters stacked within each other and extending to various depths below the sea bed.

U.S. regulations require that when removing an offshore platform, that the piles and conductors must be cut at least 16 feet below the mud line so that no projections are left which could pose a navigational hazard. However, when the piles are driven into the ocean floor, the contents of the sea bed are captured within the pile thereby creating an obstruction or "plug" that extends from the ocean floor to the bottom of the pile. The outer wall of the pile is also enclosed in mud. In order to remove the piles 16 or more feet below the mud line, therefore, it is first necessary to eliminate the mud plug or mud around the pile to at least that depth. It is common, however, to remove mud to a depth of 30 feet to create a cushion of airspace to work within in case a first attempt to remove the pile is unsuccessful and another attempt must be made higher up due to accumulated debris from the first attempt.

Current methods used to remove the mud plugs include lowering a hollow pipe the length of the casing to the mud plug. Such pipes typically have a ring of nozzles at the end nearest the mud plug that are coupled to a jet pump to deliver high volumes of water to the top of the mud plug and have an air line within the pipe to lift the mud or slurry upward through the pipe to the surface, where it is expelled into open water. Current methods for removing mud from around the pile include sending divers down to literally dig the pile out. The platforms may then be removed via available means, for example, with explosives or mechanical cutters driven from the surface, or by the method disclosed in a co-pending U.S. patent application entitled "Method and Apparatus for Cutting Metal Casings With an Ultra High Pressure Abrasive Fluid Jet."

While currently available methods provide acceptable results, it is believed that it is possible to create an improved method and system for removing mud plugs or mud from around casings that is easier to use and more efficient.

SUMMARY OF THE INVENTION

It is therefore an object of this invention to provide an improved is system for removing mud plugs from casings and mud from around casings.

It is another object of this invention to provide an apparatus and method for efficiently removing mud plugs from casings and mud from around casings.

It is another object of this invention to provide a system that will minimize the time required and simplify the removal of mud from around and inside of casings.

These and other objects of the invention, as will be apparent herein, are accomplished by providing an apparatus and method for removing obstructing mud from around or inside a casing with a submersible pump. In accordance with a preferred embodiment of the present invention illustrated herein, multiple nozzles are coupled to one end of a submersible pump that is further provided with a propeller for agitating the mud plug. The nozzles are connected to a source of water such that the nozzles may deliver between 600 and 3000 gallons per minute at between 150 and 500 psi.

In a preferred embodiment, the submersible pump and nozzle assembly is lowered through an opening in the side of the casing by any suitable means, for example, a winch, to a desired location adjacent the mud plug. The combined action of the propeller and volume of water being delivered by the nozzles serves to break up or dilute the mud plug into a slurry which is then pumped upwards by the submersible pump through a flexible hose to be discharged through the opening in the side of the casing to open water.

In an alternative embodiment, the submersible pump and nozzle assembly is lowered to the ocean floor where it acts in a manner similar to its operation inside a pile casing. The propeller and water from the nozzles break up the mud into a slurry which is then pumped upwards by the submersible pump through the flexible hose to be discharged into open water. This process is continued until a hole is excavated to a desired depth. The submersible pump and nozzle assembly may be guided so as to clean out an area adjacent the casing that has a sufficient width, depth, and slope to accommodate the selected means of removal for the casing and to prevent the hole created by the submersible pump from filling up due to sliding of mud from the walls of the hole.

In another alternative embodiment, several submersible pump and nozzle assemblies are located circumferentially around the casing such that they work together in the manner described above to excavate a circumferential area around the casing.

DETAILED DESCRIPTION OF THE INVENTION

Figure 1:
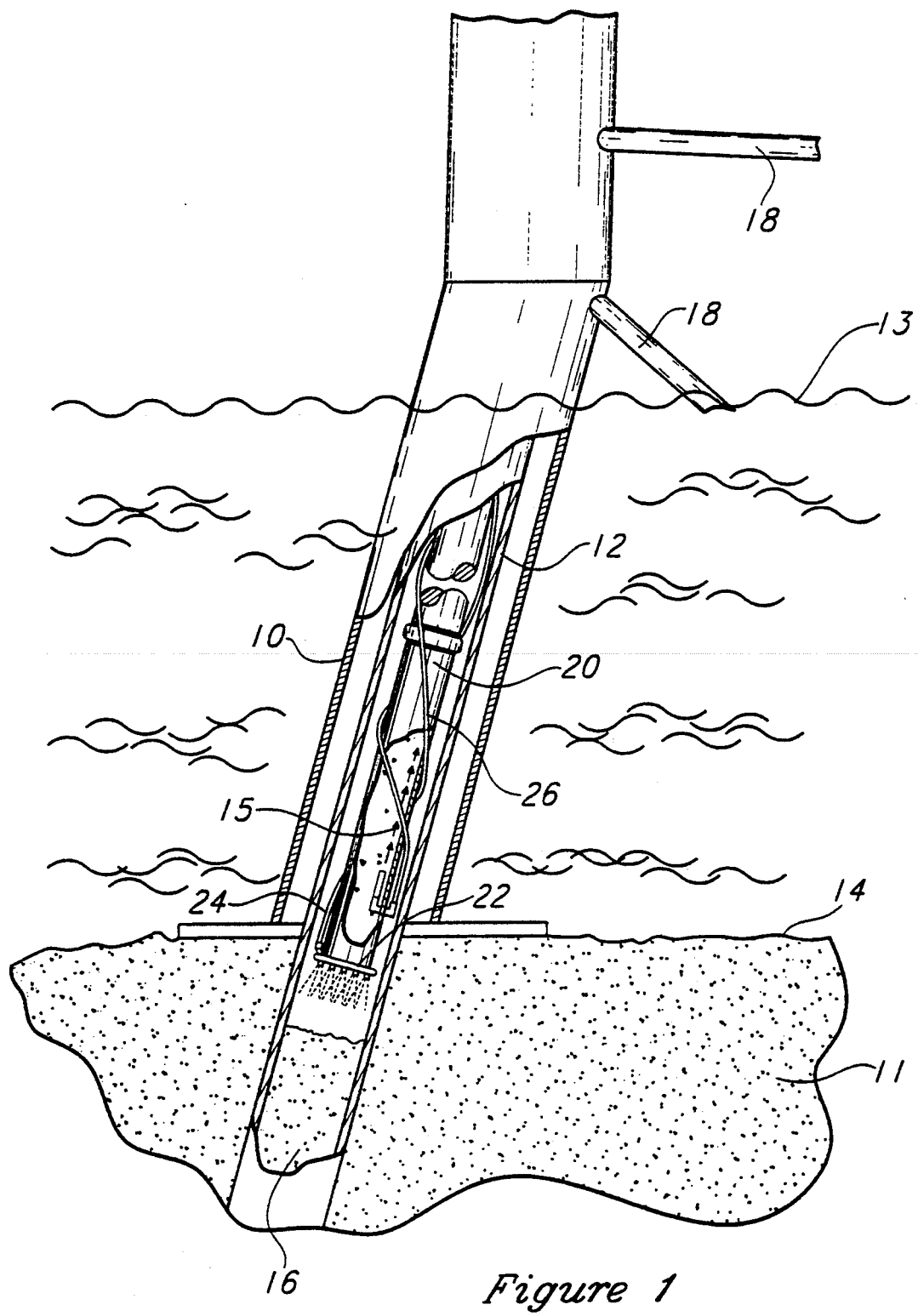
FIG. 1 is a cross-sectional elevational view of a prior art system for removing a mud plug from a casing.
Figure 2:
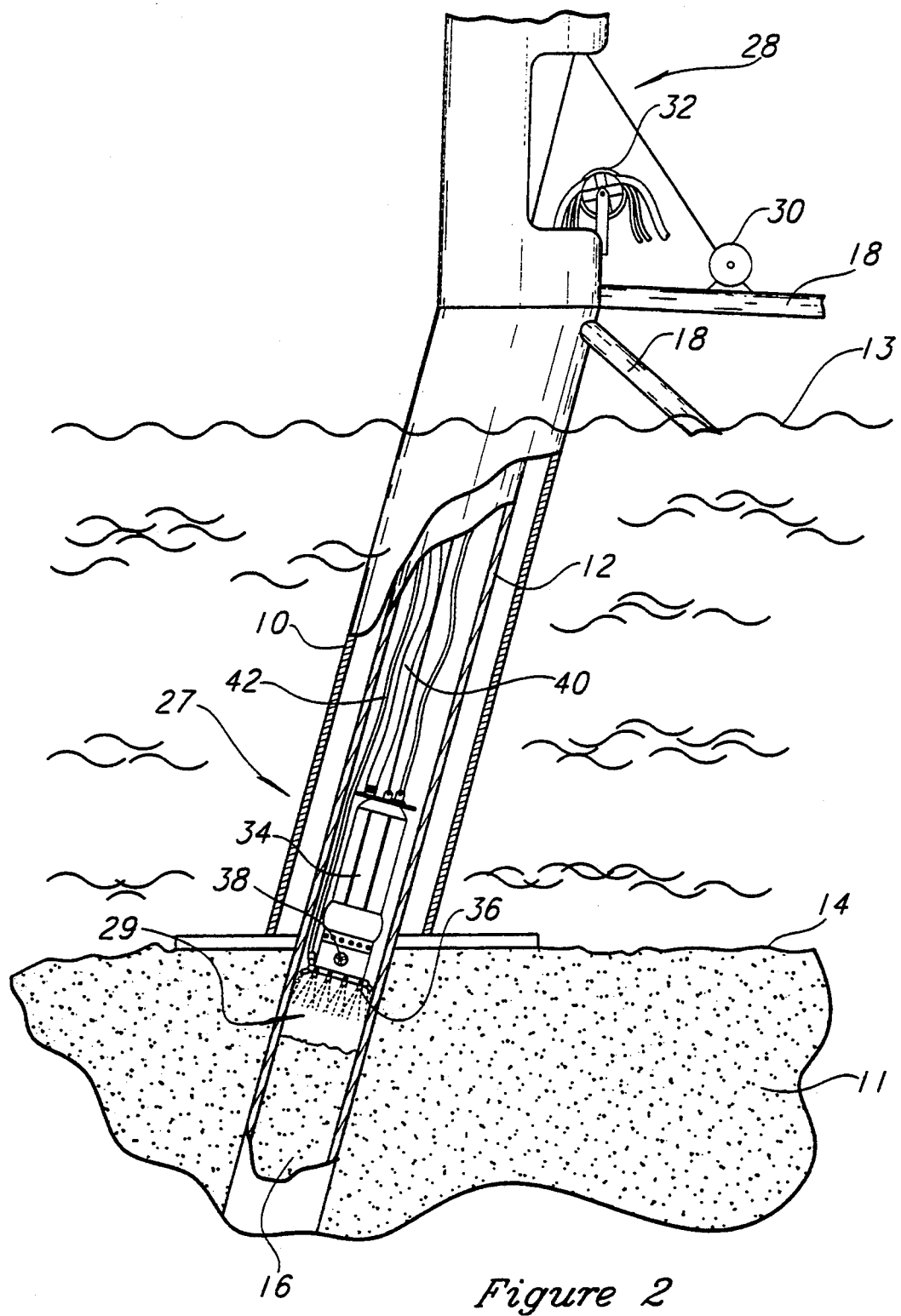
FIG. 2 is a cross-sectional elevational view of a preferred embodiment of the present invention.

As illustrated in FIGS. 1 and 2, offshore platforms (not shown) are anchored to the ocean floor 11 by piles 12 which are hollow casings or pipes contained within the platform legs 10. The platforms are further stabilized by cross-members 18. The piles 12 are driven into the ocean floor thereby capturing the contents of the sea bed or ocean floor 11 within the pile which creates an obstruction or mud plug 16. The outer wall of the pile is also encased by mud.

When decommissioned platforms are removed, U.S. law requires that the piles are removed at a depth of at least 16 feet below the mud line 14. This may be accomplished in a variety of ways, for example, by cutting or explosives. However, it is first necessary to remove the mud plug 16 or mud around the casing to the required depth.

As illustrated in FIG. 1, a prior art system 9 for removing a mud plug 16 from a casing or pile 12 includes a hard, hollow pipe 20 that is provided with a ring of nozzles 22 that are coupled to a fluid pump (not shown) via fluid line 24. The pipe 20 is further provided with an air line 26 that forces air from an air compressor (not shown) upward inside the pipe 20, as illustrated by airstream 15.

The pipe 20 is lowered inside the pile 12 and extends from a point near mud plug 16 to a point above the water line 13. Because of the weight and poor maneuverability of pipe 20, the prior art system illustrated in FIG. 1 may only be used after the upper portion of the platform is removed to expose the open platform leg 10 and pile 12, approximately 12 to 15 feet above the water. The system further requires extensive support equipment and is typically operated from a barge (not shown).

In operation, water is forced through line 24 and nozzles 22 at mud plug 16. The mud is then moved upward by a lifting effect created by air stream 15. It will be appreciated by one of ordinary skill in the art that the mud and water must be moved upward through the entire length of pipe 20 by air stream 15 before it is discharged to the open water.

As illustrated in FIG. 2, a preferred embodiment 27 of the present invention is provided with a submersible pump 34 having a propeller 38 or some other means for agitating the mud pile 16. In a preferred embodiment, submersible agitator pump DP-10H, manufactured by Toyo, is used.

Figure 3:
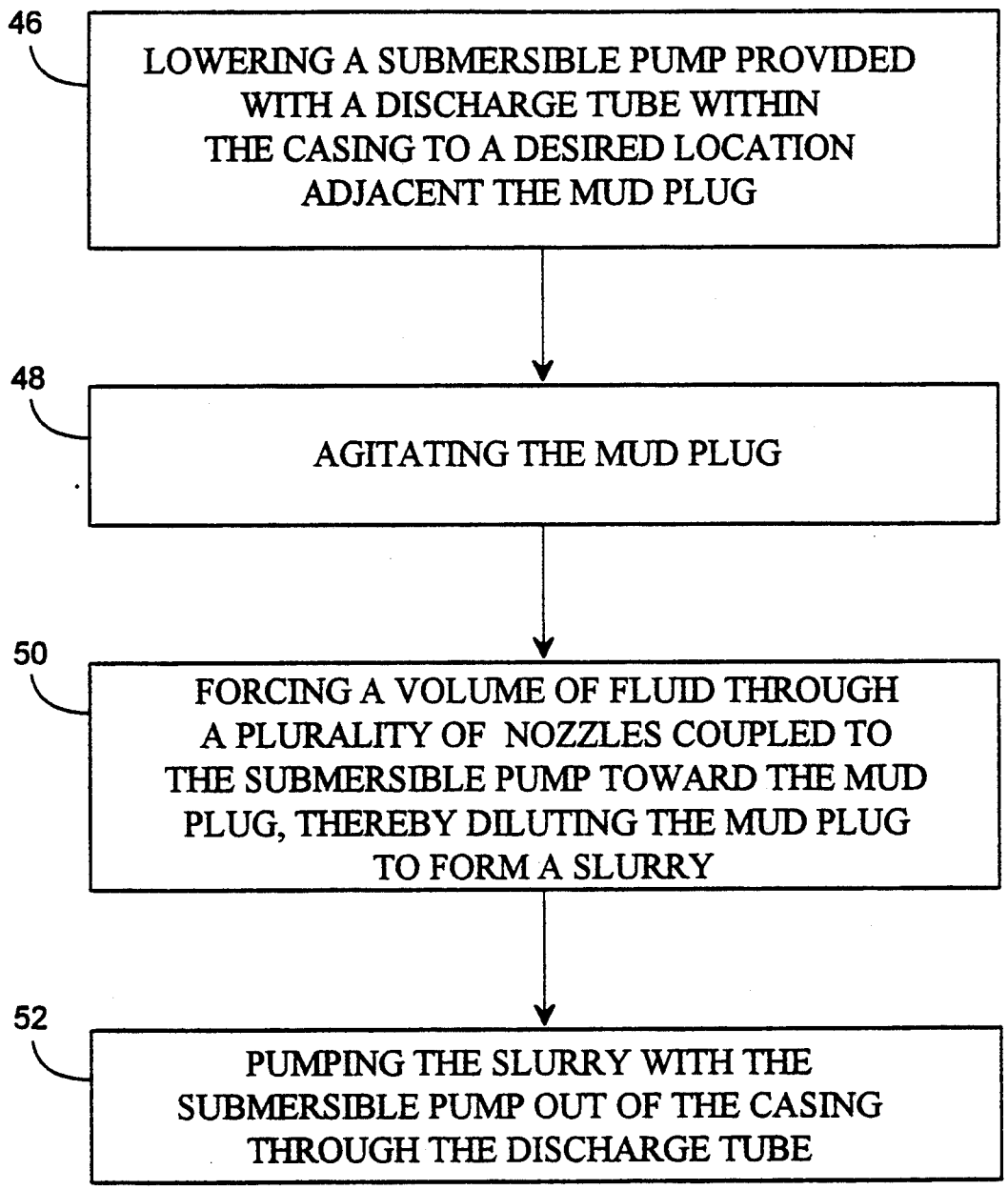
FIG. 3 is a diagram illustrating the steps of a preferred embodiment of the present invention.

As further illustrated in FIGS. 2 and 3, a plurality of nozzles 36 are coupled to a first end 29 of the submersible pump 34. The nozzles 36 are coupled to a fluid pump (not shown) via fluid line 42.

In operation, as illustrated in FIGS. 2 and 3, the submersible pump 34 is lowered to a desired position adjacent mud plug 16, step 46, via winch 30 or any other feasible means. Because of the relatively small size and light weight of pump 34, the pump and nozzle assembly may be lowered into position through an opening 28 cut into a side of the platform leg 10 and casing 12. The opening 28 may be located at any convenient point above the water line, as long as it is within the range of the submersible pump. In a preferred embodiment wherein a DP-10H pump by Toyo is used, the opening 28 may be located up to 75 feet above the water line. It is therefore not necessary to first remove the deck of the platform as is required for currently available methods.

After the submersible pump is lowered into place, a volume of fluid is forced through nozzles 36 toward the mud plug, thereby diluting the mud to form a slurry, step 50. In a preferred embodiment, water is forced through the nozzles at a rate of 600-3000 gallons per minute, and at a pressure of between 150-500 psi, with preferred results being achieved at a flow rate of 1400 gallons per minute and a pressure of 350 psi. This break up of the mud plug 16 is further enhanced by the agitation provided by propeller 38, step 48. The mud and water or slurry is then pumped upward by submersible pump 34 through discharge tube 40 to the open water, step 52. As illustrated in FIG. 2, any suitable means, for example, spool 32, may be used to let out the various lines and keep them untangled.

By removing a mud plug in accordance with the present invention, substantially all of the mud is removed, because the submersible pump 34 continues to pump and contain the mud within discharge tube 40 as pump 34 is removed from pile 12. In comparison, prior art systems typically leave a considerable amount of mud behind because mud that is suspended the length of the hollow pipe 20 by the air flow 15 resettles in the pile 12 as soon as the airflow 15 is no longer present. In addition, the method and apparatus embodying the present invention can remove a mud plug to a depth of 30 feet in approximately 1 hour, as compared to 6 hours by a prior art system, and are much easier and less cumbersome to use.

Prior art systems for removing mud from adjacent or around a casing include sending divers down to dig the casing out.

Figure 4:
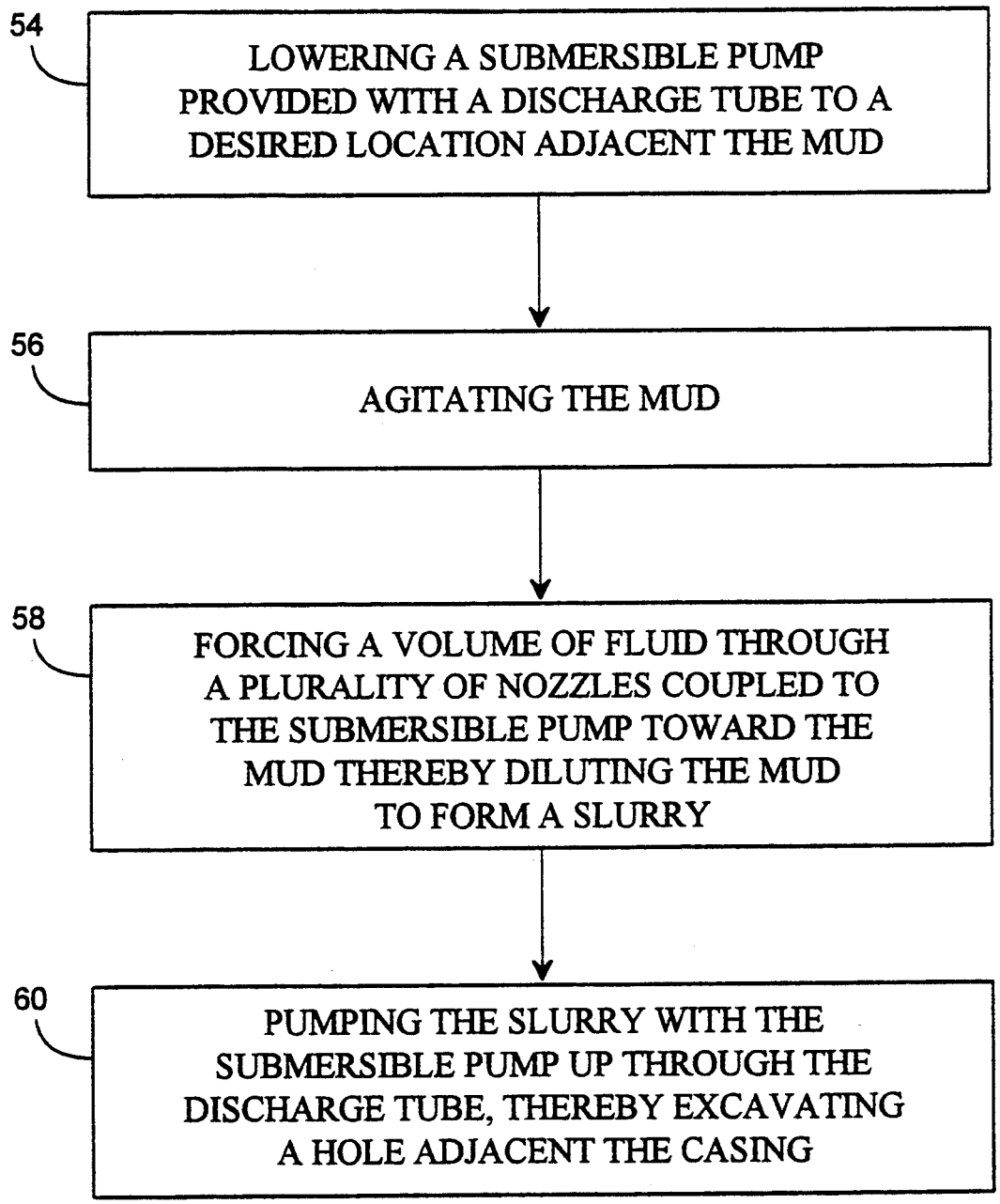
FIG. 4 is a diagram illustrating the steps of an alternative embodiment of the present invention.

This goal is achieved more quickly and efficiently in accordance with an alternative embodiment of the present invention, as illustrated in FIG. 4. A submersible pump and nozzle assembly as illustrated in FIG. 2 is used to excavate a hole adjacent casing 12. This is accomplished by lowering the submersible pump 34 provided with flexible discharge tube 40 to a desired location adjacent the mud and adjacent the pile 12, step 54. The mud is then agitated, step 56, and a volume of fluid, preferably water, is forced through the plurality of nozzles toward the mud to dilute the mud into a slurry, step 58. The slurry is then pumped away from the casing by the submersible pump, thereby excavating a hole adjacent the casing. After a hole is excavated to a desired depth, the submersible pump 34 may be guided to a new location adjacent the excavated hole to create a hole of any desired depth or width as may be necessary to accommodate the chosen method for removing the casing.

Figure 5:
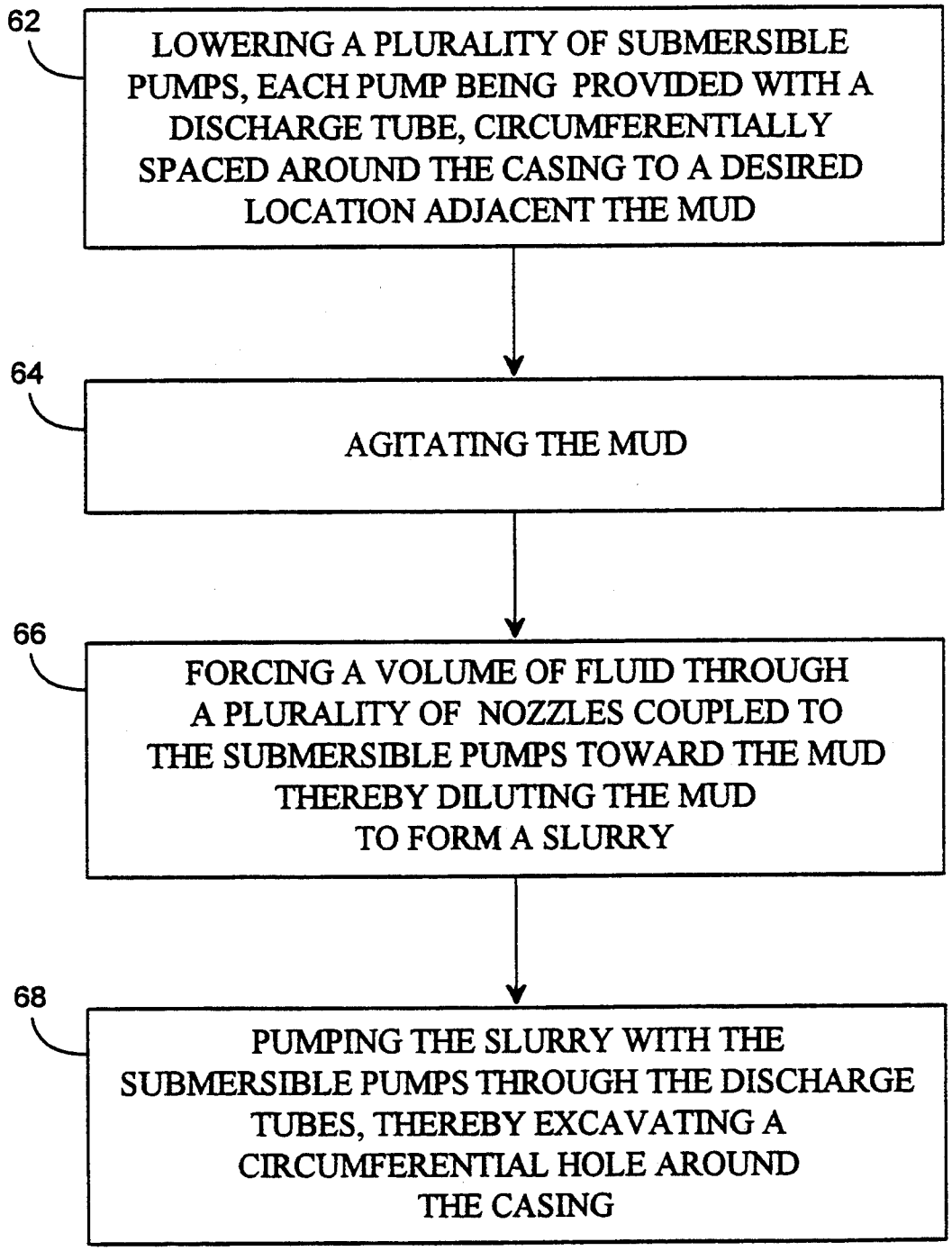
FIG. 5 is a diagram illustrating the steps of a second alternative embodiment of the present invention.

In a method employed by a second alternative embodiment, as illustrated in FIG. 5, a plurality of submersible pumps provided in accordance with the invention are used to excavate a circumferential hole around the casing. This is accomplished by lowering the submersible pumps in a circumferential pattern around the casing to desired locations adjacent the mud to be removed, step 62. The mud is then agitated by the pumps, step 64, and a volume of fluid is forced through a plurality of nozzles coupled to the pumps toward the mud, thereby diluting the mud to form a slurry, step 58. The mud is then pumped away from the casing by the submersible pumps, thereby excavating a circumferential hole around the casing, step 68.

From the foregoing, it will be appreciated that, although embodiments of the invention have been described herein for purposes of illustration, various modifications may be made without deviating from the spirit of the invention. For example, the embodiments described above may be used to remove mud from around or from inside of a casing that is driven into the ground, rather than the ocean floor. Thus, the present invention is not limited to the embodiments described herein, but rather is defined by the claims which follow.

We claim:

1. A method for removing a mud plug from a casing comprising:

providing an opening in a side of the casing;

lowering a submersible pump provided with a discharge tube through the opening into the casing to a desired location adjacent the mud plug; agitating the mud plug;

forcing a volume of fluid through a plurality of nozzles coupled to the submersible pump toward the mud plug thereby diluting the mud plug to form a slurry; and pumping the slurry with the submersible pump out of the casing through the discharge tube.

2. The method according to claim 1, further comprising:

delivering 600–3000 gallons per minute of water at 150–500 psi toward an exposed surface of the mud plug.

3. A method for removing a mud plug from a casing comprising:

providing an opening in a side of the casing;

lowering a submersible pump provided with a discharge tube through the opening into the casing to a desired location adjacent the mud plug;

agitating the mud plug;

forcing a volume of fluid through a plurality of nozzles coupled to the submersible pump toward the mud plug thereby diluting the mud plug to form a slurry; and pumping the slurry with the submersible pump out of the casing through the discharge tube.

4. The method according to claim 3, further comprising:

delivering 600–3000 gallons per minute of water at 150–500 psi toward an exposed surface of the mud plug.

5. A method for removing a mud plug from a casing comprising:

lowering a submersible pump provided with a discharge tube through an opening in a side of the casing to a desired location adjacent the mud plug;

agitating the mud plug;

forcing a volume of fluid through a plurality of nozzles coupled to the submersible pump toward the mud plug, thereby diluting the mud plug to form a slurry; and pumping the slurry with the submersible pump out of the casing through the discharge tube.

6. A method for removing a mud plug from a casing comprising:

lowering a submersible pump provided with a discharge tube through an opening in a side of the casing to a desired location adjacent the mud plug;

forcing a volume of fluid through a plurality of nozzles coupled to the submersible pump toward the mud plug, thereby diluting the mud plug to form a slurry; and pumping the slurry with the submersible pump out of the casing through the discharge tube.

* * * * *